United States Patent
Pendleton

(10) Patent No.: US 9,895,024 B2
(45) Date of Patent: Feb. 20, 2018

(54) FOOD MIXING ARRANGEMENT

(71) Applicant: Kenwood Limited, Havant, Hampshire (GB)

(72) Inventor: Oliver Pendleton, Havant (GB)

(73) Assignee: KENWOOD LIMITED, Havant, Hampshire (GB)

(*) Notice: Subject to any disclaimer, the term of this patent is extended or adjusted under 35 U.S.C. 154(b) by 270 days.

(21) Appl. No.: 14/651,352

(22) PCT Filed: Dec. 9, 2013

(86) PCT No.: PCT/GB2013/053233
§ 371 (c)(1),
(2) Date: Jun. 11, 2015

(87) PCT Pub. No.: WO2014/091211
PCT Pub. Date: Jun. 19, 2014

(65) Prior Publication Data
US 2016/0000265 A1   Jan. 7, 2016

(30) Foreign Application Priority Data

Dec. 14, 2012 (GB) .................................. 1222536.3

(51) Int. Cl.
*A47J 43/044* (2006.01)
*B01F 7/00* (2006.01)
(Continued)

(52) U.S. Cl.
CPC ......... *A47J 43/044* (2013.01); *A47J 43/0711* (2013.01); *B01F 7/00275* (2013.01);
(Continued)

(58) Field of Classification Search
CPC ............... B01F 7/16–7/32; B01F 7/302; B01F 7/00275; B01F 7/1615; B01F 2015/00603;
(Continued)

(56) References Cited

U.S. PATENT DOCUMENTS 1,415,735 A * 5/1922 Trust .................... B01F 7/1605
366/288
1,612,281 A * 12/1926 Goetz .................. A47J 43/1025
366/244
(Continued)

FOREIGN PATENT DOCUMENTS

FR    2 954 181       6/2011
JP    2011-104491 A   6/2011

OTHER PUBLICATIONS

Office Action, and English language summary thereof, in corresponding Chinese Application No. 201380065491.1, dated Nov. 7, 2016.
(Continued)

*Primary Examiner* — Tony G Soohoo
(74) *Attorney, Agent, or Firm* — Brinks Gilson & Lione; G. Peter Nichols

(57) ABSTRACT

A tool that is attachable to an electrically driven stand mixer and configured, when suspended into a bowl and driven in planetary motion by the stand mixer, to perform a mixing operation that involves folding ingredients together without substantial expulsion of air from the mix. The device aims to automate the folding action by providing a food mixing arrangement in which a tool having a wing-like volute blade is suspended by its shaft from a drive outlet of the stand mixer and executes a planetary motion within a mixing bowl. The blade is twisted along its length and has curved surfaces formed to gently lift and turn ingredients to be
(Continued)

mixed in the bowl so as to simulate a gentle folding action similar to that achieved manually by an experienced cook.

11 Claims, 5 Drawing Sheets

(51) Int. Cl.
  *B01F 7/16* (2006.01)
  *B01F 15/00* (2006.01)
  *A47J 43/07* (2006.01)

(52) U.S. Cl.
  CPC ..... *B01F 7/1615* (2013.01); *A47J 2043/0449* (2013.01); *B01F 2015/00603* (2013.01); *B01F 2015/00623* (2013.01)

(58) Field of Classification Search
  CPC ........... B01F 2015/00623; A47J 43/044; A47J 43/0711; A47J 2043/0449
  See application file for complete search history.

(56) References Cited

U.S. PATENT DOCUMENTS

| | | | | | |
|---|---|---|---|---|---|
| 1,826,242 | A * | 10/1931 | Dehuff | ................ | A21C 1/1405 366/343 |
| 2,123,600 | A * | 7/1938 | Galante | ................ | B01F 7/165 366/247 |
| 3,075,746 | A * | 1/1963 | Yablonski | ............ | B01F 7/1605 366/288 |
| 3,151,847 | A * | 10/1964 | Broomall | .............. | B01F 7/1605 366/287 |
| 3,224,744 | A * | 12/1965 | Broomall | .............. | B01F 7/1605 366/288 |
| 3,342,460 | A * | 9/1967 | Bolde | ................... | A47J 43/044 366/251 |
| 4,337,000 | A * | 6/1982 | Lehmann | ............. | A21C 1/1405 366/288 |
| 4,704,035 | A * | 11/1987 | Kowalczyk | ....... | B01F 15/00207 366/142 |
| 4,893,940 | A * | 1/1990 | Waisberg | .............. | B01F 13/002 366/247 |
| 5,028,141 | A * | 7/1991 | Stiegelmann | ..... | B01F 15/00922 366/245 |
| 5,150,968 | A * | 9/1992 | Inoue | ........................ | B01F 7/30 366/286 |
| 5,906,432 | A * | 5/1999 | Wade | ........................ | A21C 1/02 366/100 |
| 6,533,448 | B1 * | 3/2003 | Drocco | .................... | A21C 1/02 366/306 |
| 6,652,137 | B1 * | 11/2003 | Bosch | ................ | B01F 7/00291 366/288 |
| 6,997,597 | B2 * | 2/2006 | Drocco | .................... | A21C 1/02 366/224 |
| 2002/0181322 | A1 * | 12/2002 | Brunswick | .......... | A47J 43/0705 366/197 |
| 2006/0209629 | A1 * | 9/2006 | Fallowes | ................ | A47J 43/0711 366/312 |
| 2006/0268659 | A1 * | 11/2006 | Kaas | .................... | A47J 43/0711 366/312 |
| 2009/0007820 | A1 * | 1/2009 | Itoh | ........................... | B01F 7/30 106/400 |
| 2009/0314698 | A1 * | 12/2009 | Higbee | ............... | B01F 7/00341 210/150 |
| 2011/0103177 | A1 * | 5/2011 | Denize | ............... | B01F 7/00716 366/244 |
| 2012/0120755 | A1 | 5/2012 | Fallowes et al. | | |
| 2013/0135964 | A1 * | 5/2013 | Seidler | ................ | A47J 43/0711 366/343 |
| 2014/0010041 | A1 * | 1/2014 | Inoue | ........................ | B01F 7/161 366/287 |
| 2015/0231579 | A1 * | 8/2015 | Inoue | ........................ | B01F 7/30 366/287 |

OTHER PUBLICATIONS

PCT/GB2013/053233 International Search Report dated Feb. 12, 2014.

* cited by examiner

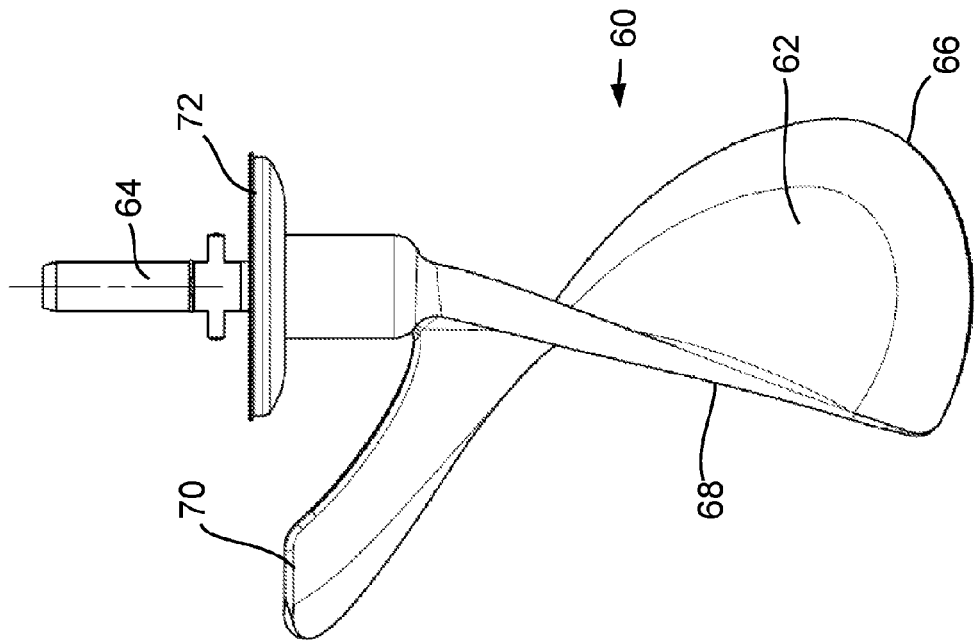
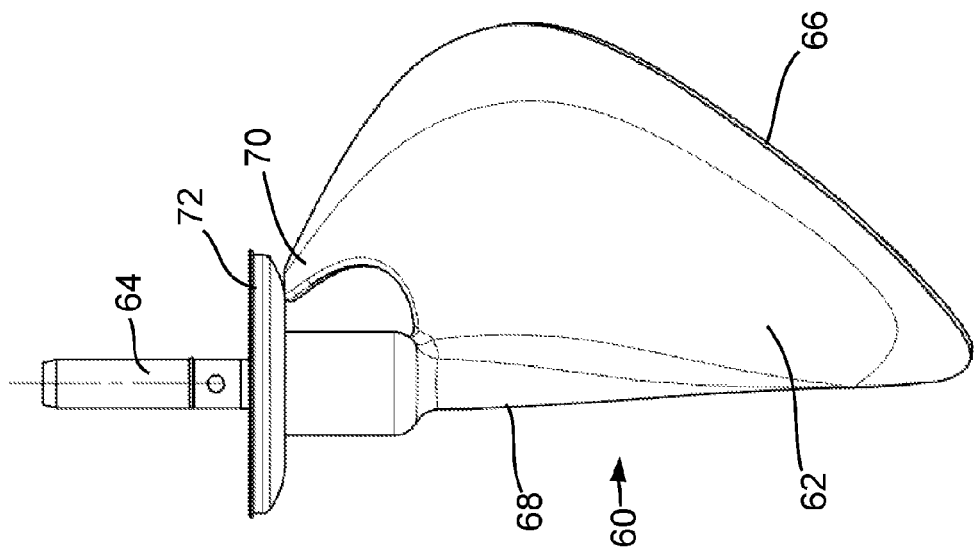

FOOD MIXING ARRANGEMENT

This application claims priority to International Application No. PCT/GB2013/053233 filed Dec. 9, 2013 and to Great Britain Application No. 1222536.3 filed Dec. 14, 2012; the entire contents of each are incorporated herein by reference.

This invention relates to food mixing arrangements, and it relates more especially to the configuration of a tool that is attachable to an electrically driven stand mixer and usable for mixing ingredients in a bowl. The tool is particularly configured, when hosted by a stand mixer and driven in planetary motion thereby, to perform a mixing operation that involves folding ingredients together without substantial expulsion of air from the mix.

Such processing is quite difficult to carry out manually, since the ingredients must be moved in a way that takes practice to perfect. Typically, a large spoon is used to gently lift and fold together ingredients to be cooked. However, over-folding or under-folding can result in unsatisfactory results, either with the final cooked product not rising fully and/or with the ingredients not being mixed together properly.

The present invention aims to simplify the folding process by providing a tool which, when used as an attachment to a stand mixer, automates and optimises the folding action so that users can reliably produce acceptable results, even if they are not experienced in the requisite manual folding techniques.

According to the invention there is provided a food mixing arrangement comprising a tool incorporating a wing-like member with a volute blade adapted for suspension by a shaft from a drive outlet of a stand mixer capable of causing the wing-like member to execute a planetary motion within a mixing bowl, whereby said shaft rotates in one direction around its own axis whilst being bodily moved in the opposite rotational direction about another axis parallel to, but offset from, that of the shaft; and wherein curved surfaces of the wing-like member are formed to gently lift and turn ingredients to be mixed in said bowl.

By this means, the gentle folding action achieved by an experienced cook using spoons is simulated.

The term "volute blade" is intended to encompass wing-like, elongate blades which extend outwardly from a suspension location and which are twisted along their length.

Preferably, leading edges of such blades are thinned relative to the remainder of the blade. It is still further preferred, moreover, that the blade thickens progressively from said leading edge towards a thicker central column providing strength for the tool.

Preferably the twist of the volute blade comprises a part spiral form.

In some embodiments, the part spiral comprises 0.5 turn or less about the shaft axis. In one preferred embodiment, the spiral comprises 0.45 turns.

In some other preferred embodiments of the invention, the volute blade is formed into one or more spiral turns.

Preferably, the wing-like member further comprises an upper shoulder portion extending outwardly from the vicinity of said shaft axis and shaped to return to the mixture ingredients tending to move upwardly within the bowl.

It is preferred that the wing-like member is formed with a compound curvature and tilt to simulate manual folding of ingredients using a spoon.

Any embodiment of the invention can usefully be configured such that a leading edge of the tool supports a flexible elastomeric material, thereby ensuring that the tool consistently contacts the inside of the bowl.

To utilise the invention, a user simply attaches the wing-like member by its shaft to a food mixer, sets the operating speed of the food mixer to the desired speed and runs the machine for a predetermined length of time.

In order that the invention may be clearly understood and readily carried into effect, one embodiment thereof will now be described, by way of example only, with reference to the accompanying drawings of which:

FIGS. 3 to 6 show a tool for a mixing arrangement in accordance with one example of the invention, viewed from the front, one side, rear and the other side respectively;

Figure 1:
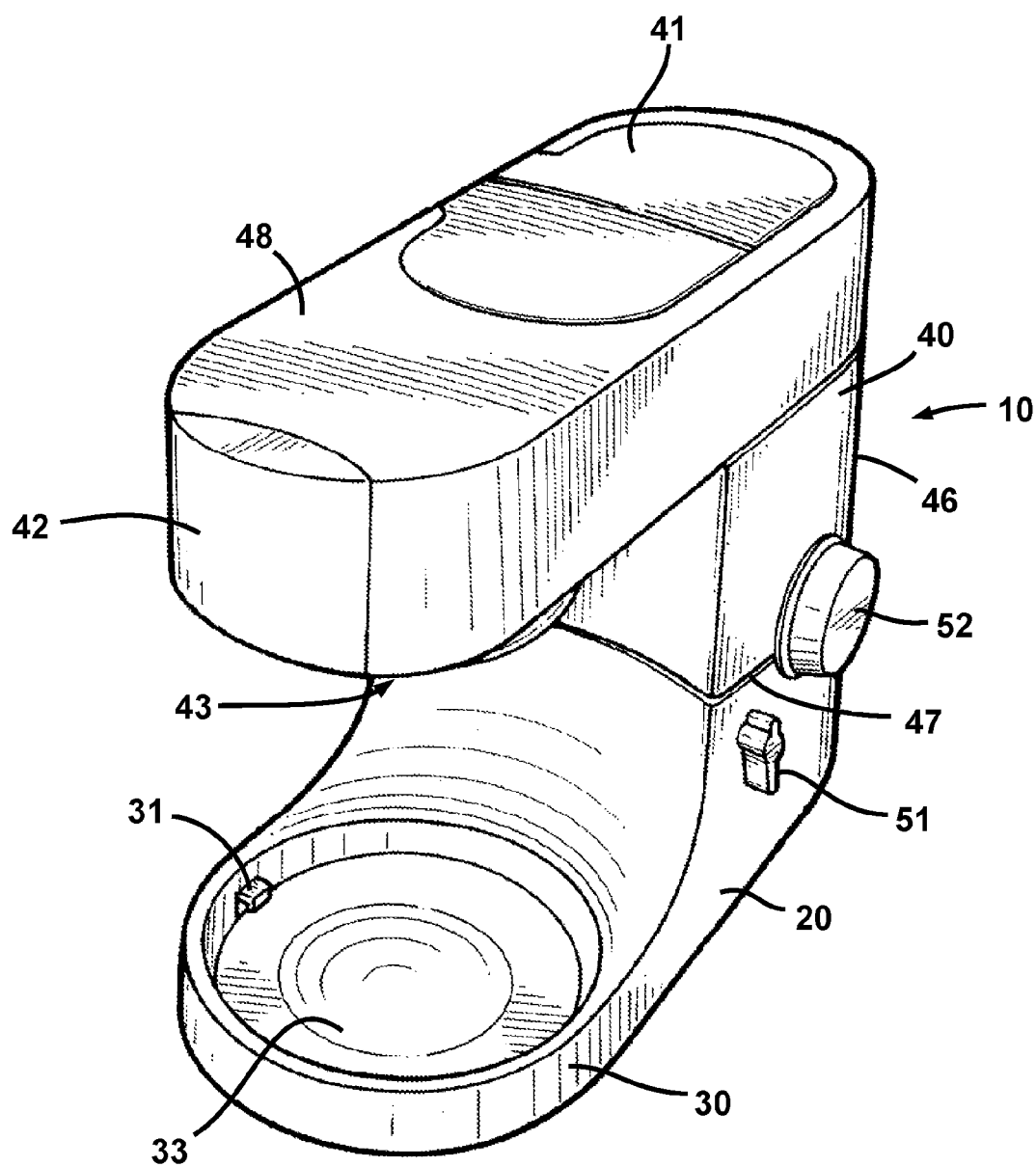
FIGS. 1 and 2 show, in side and front elevations respectively, a typical stand mixer usable in an arrangement according to one example of the invention.
Figure 2:
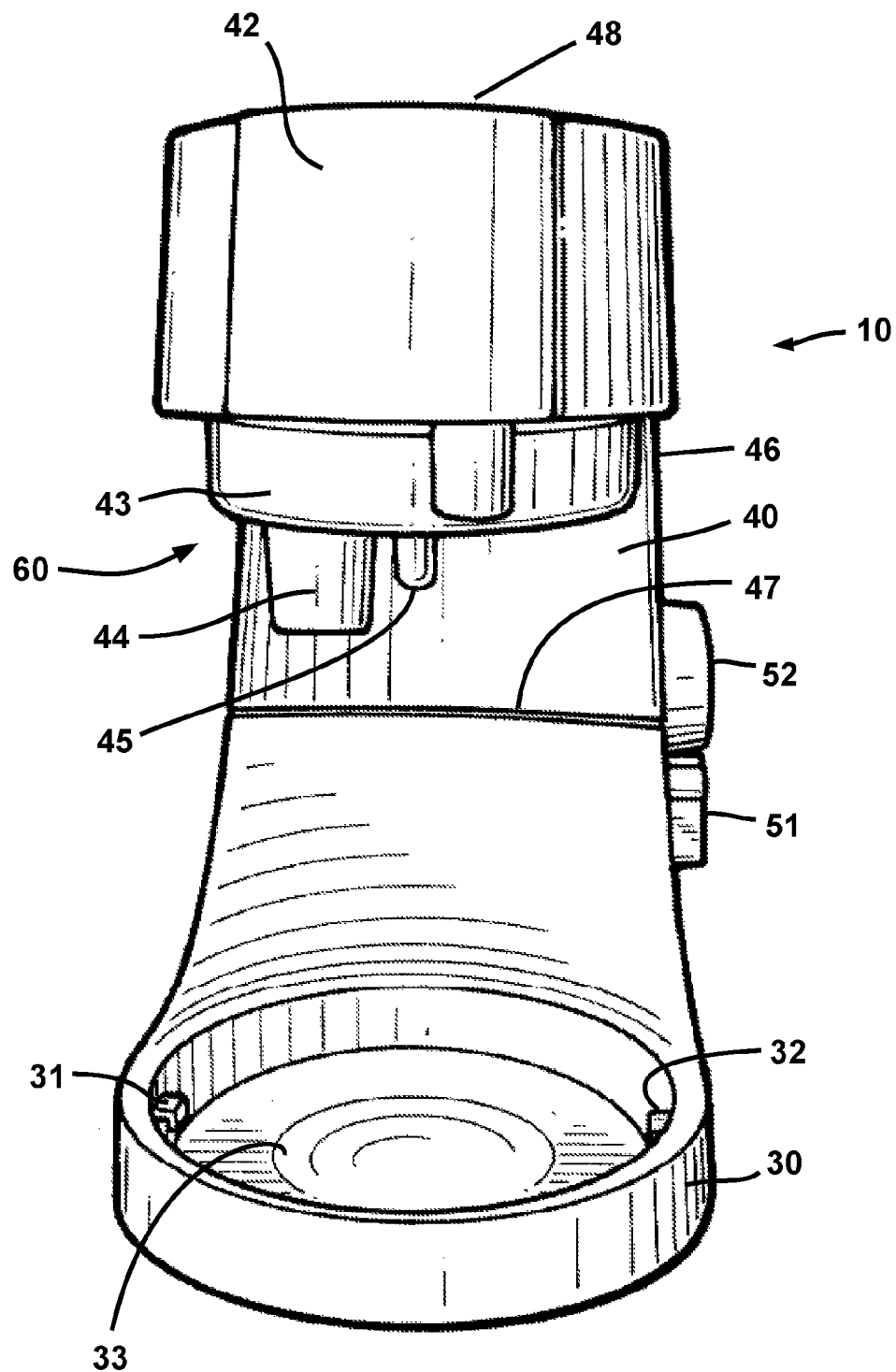
Figure 4:
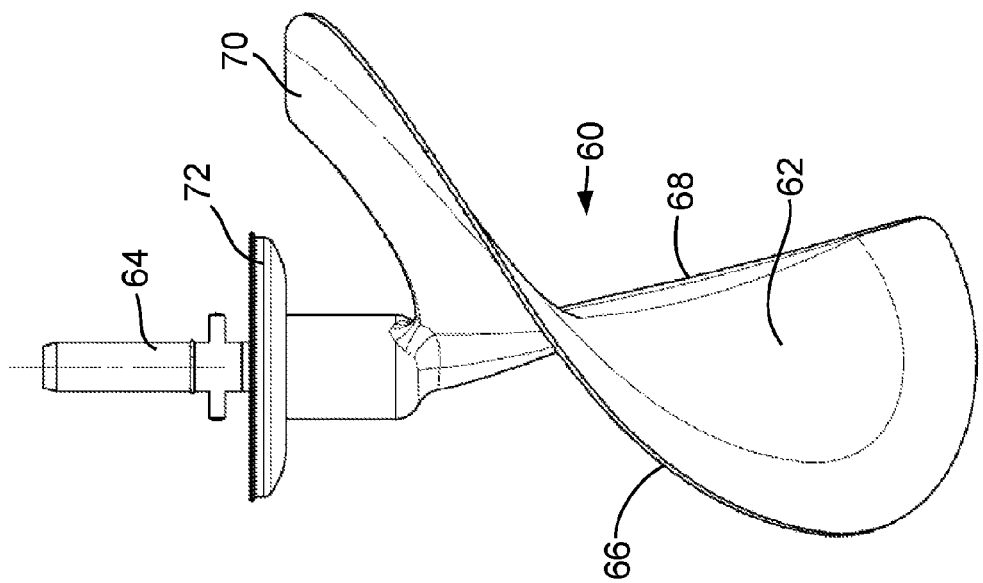
Figure 3:
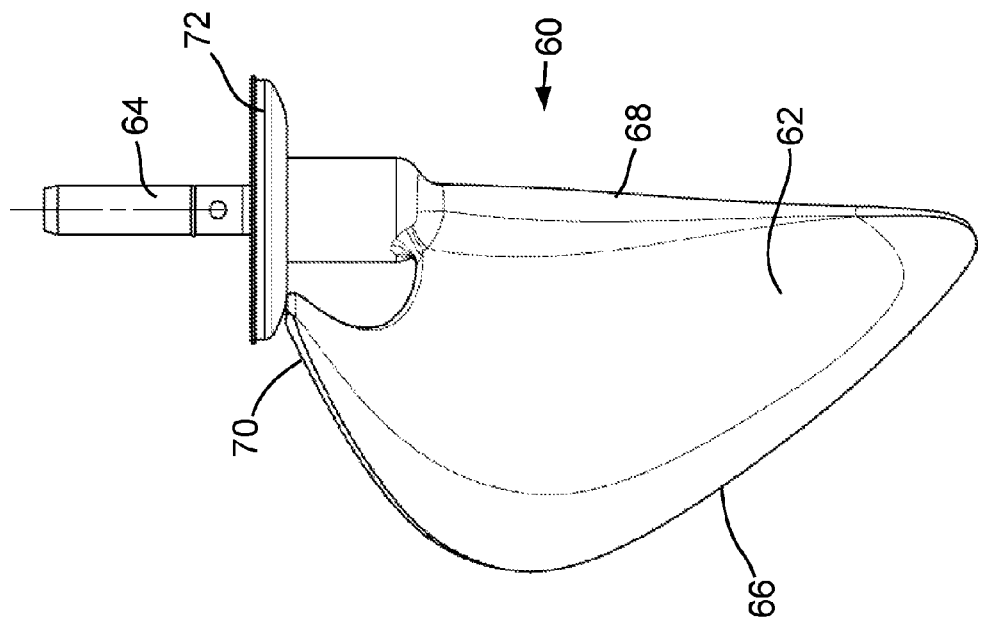
Figure 7:
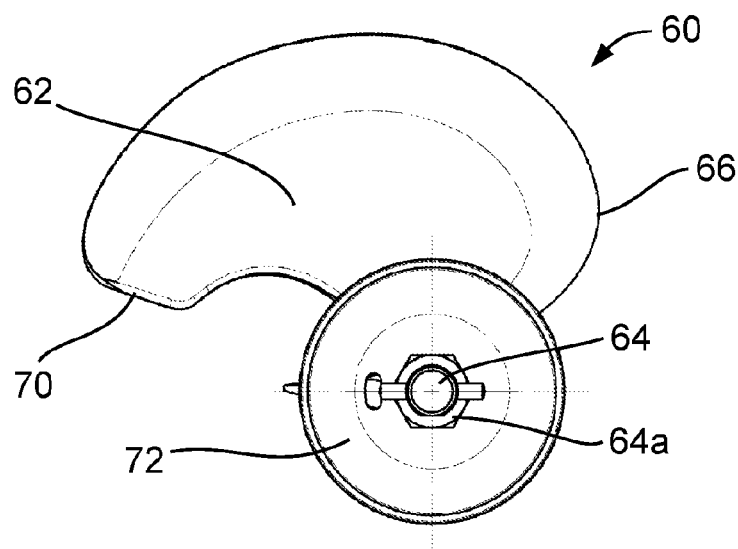
FIG. 7 is shows the tool in plan elevation from above.

Referring now to FIGS. 1 and 2, in which corresponding features carry the same reference numbers, a typical stand mixer 10 is generally "C" shaped, and comprises a pedestal 20, which supports a bowl platform 30, an upright housing portion 40 and a head portion 48 which extends from the top of the upright portion to run overhead of the bowl platform 30. An electric motor (not shown) is mounted, either in the upright portion 40 of the mixer 10 or in the head portion 48, depending (inter alia) upon the type of motor used, the desired operating characteristics of the mixer 10 and ergonomics/design criteria. In any event, gearing (not shown) is provided to convey the motive power supplied by the motor to a plurality of drive outlets to which various tools can be attached to perform a wide variety of tasks in the kitchen.

In this particular example, there is provided a high-speed blender drive outlet behind covers 41, a slow-speed mincer drive outlet behind cover 42 and a planetary drive, intended for food mixing, overhead of the bowl location, at 43, although it will readily be appreciated that more, fewer and/or different drive outlets can be provided in accordance with desired functionality of the stand mixer.

A shanked mixing tool, attached as is conventional, to a socket 44 of the outlet 43, will depend in use into a mixing bowl placed on the bowl platform 30, and is configured to rotate about both the axis of the socket 44 and the central axis 45 of the outlet 43, thus performing a planetary mixing action. In this example, and preferably, the two rotations performed by the tool in executing its planetary motion are in opposed angular directions. Thus the tool may rotate clockwise about axis 44 whilst processing counter-clockwise about the axis 45.

As shown in FIGS. 1 and 2, the stand mixer 10 is, in this example, provided with a pair of latches 31, 32 within a recess 33 provided in the bowl platform 30, which latches co-operate with components on the base of the bowl to form a bayonet latching system which ensures firm and ready location of the bowl on its platform. Other latching systems, such as screw-threading for example, can be used as an alternative to bayonet latching if preferred.

The upright part 46 of the housing 40 is configured with a break line 47, to permit the top part 48 of the stand mixer to be hinged away from the platform 30 end of the pedestal part 20, in order to facilitate the insertion and removal of the mixing tools and the bowl.

The stand mixer 10 also incorporates electrical and mechanical user controls 51, 52 in conventional fashion.

Referring now additionally to FIGS. 3 through 7, a tool 60 for attachment to and suspension from the aforementioned drive socket 44 consists of a wing-like, helically shaped blade 62 attached to a metal shaft 64 that allows the tool to be securely but releasably inserted into the drive outlet socket 44 of the stand mixer 10. The shaft 64 is attached, in this example, to the blade 62 by screwing it into a threaded insert (not shown) over which the upper part of the blade is moulded. This arrangement, of screwing the shaft 64 into the insert, allows adjustment of the height of the tool in the bowl; thus ensuring that the tool can be positioned at the correct height for effective operation. The chosen height is maintained in conventional manner by tightening a locking nut 64a (FIG. 7) against the insert.

The leading edge 66 of the tool 60 is thinned, in order to facilitate cutting through the ingredients to be folded. From the leading edge 66 the blade thickens progressively towards a thicker central column 68 which provides the primary strength of the tool 60.

The helical shape of the wing-like blade 62 of the tool 60 is configured to scoop ingredients from the bottom of the bowl and gently lift them up through the other ingredients to gently combine them together without removing air from the mixture. The leading edge 66 of the blade 62 is arranged to pass as close as possible to the edge of the bowl, in order to scoop mixture from the edge of the bowl into the centre for combination with ingredients that have been pulled up from the bottom of the bowl, and again this is done gently to avoid knocking air from the mix.

The top of the blade 62 is formed with a large shoulder 70 that is used to incorporate back into the mixture lighter ingredients that have risen to the top of the bowl during processing. The shoulder 70 is configured to cut though these ingredients and pull them into the middle of the bowl, facilitating incorporation into the mix. It will be appreciated by those skilled in the art that the shoulder 70 could be formed into any of a variety of different shapes and that its form may even become concave in respect the rest of the blade.

To prevent food ingress into the hub of the mixer the tool 60 is fitted with a guard 72 that is fitted in between the threaded insert and the locking nut 64a.

The helix of the wing-like blade 62 in this example makes 0.45 turns, although in other embodiments of the invention, the blade can make any number of turns creating more of a corkscrew effect to the tool. The edge 66 of the blade 62 is preferably orientated at 90° to the edge of the bowl. If preferred, however, the edge 66 of the blade could be orientated at any angle to the edge of the bowl, thereby creating different blade profiles.

The blade 62 of the tool 60 is intended to rotate clockwise around the axis of the metal shaft 64 whilst the tool 60 as a whole rotates counter clockwise around the bowl. It will however be appreciated that, in other embodiments of the invention, the blade and the tool can rotate in any direction, and moreover that a gearbox could be attached to the tool 60 to allow rotation and counter rotation at a variety of different speeds.

The tool 60 as described is made from a plastic material such as a polymer but could alternatively be made from a variety of materials with different flexural and hardness properties. Alternatively, or in addition, the tool could be made with the leading edge 66 of the tool 60 made from a flexible elastomer that is either over moulded onto or otherwise mounted to the tool 60, to create a flexible blade edging that allows the edge 66 of the tool to consistently contact the inside of the bowl. The leading edge 66 of the tool 60 is typically 1 mm thick, although other thicknesses can be used if preferred in order to allow the use of different blade profiles and/or materials.

Figure 8:
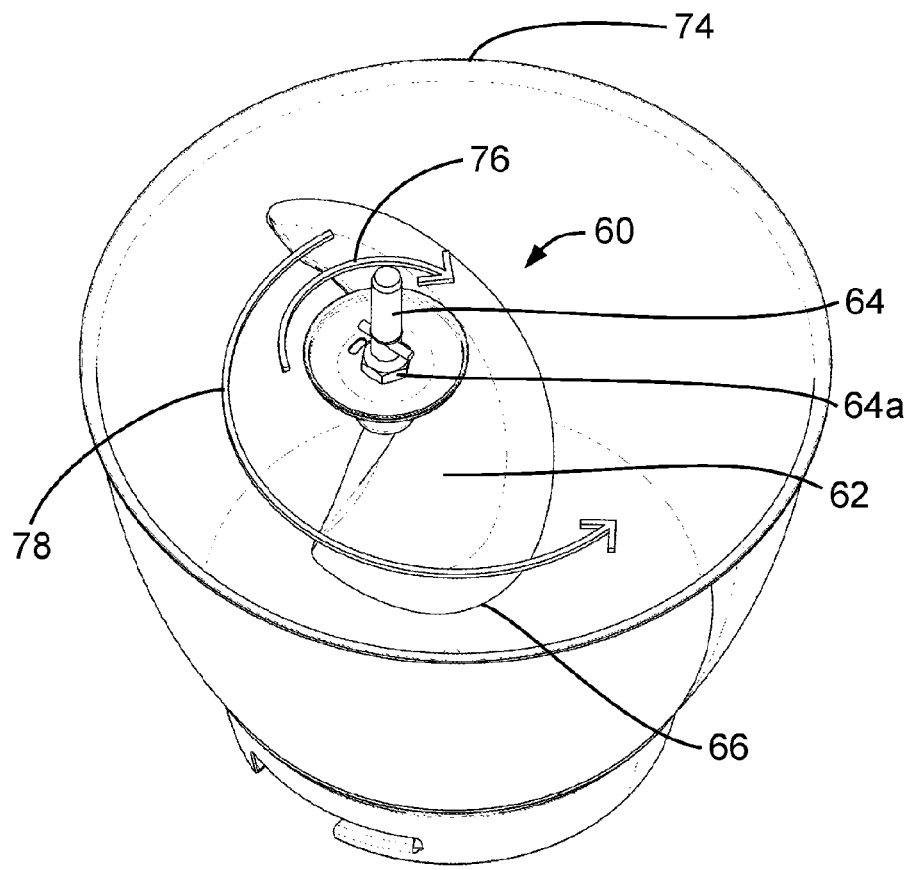
FIG. 8 shows the tool in a bowl.

FIG. 8 shows the tool 60 suspended into a bowl 74 which is intended to sit on the bowl platform 30 and to be releasably latched into the recess 33 by means of a bayonet fixture on the base of the bowl 74 which co-operates with the latches 31 and 32 described earlier in relation to FIGS. 1 and 2. As mentioned earlier, alternative ways of securing the bowl to the base 30 can be used if preferred. FIG. 8 has arrows 76 and 78 to indicate respectively the direction (clockwise in this example) in which the tool 60 spins around the axis of its shank 64, and the direction (anticlockwise in this example) in which the tool as a whole precesses around the drive axis 45 (see FIG. 2) of the mixer 10.

This combination of movements defines a planetary motion which causes the leading edge 66 of the tool 60 to repeatedly approach closely the inner wall of the bowl 74 and then turn away from it. The blade 62 is shaped so that, on each approach to the inner wall of the bowl 74, it lifts ingredients gently, using the inner wall of the bowl 74 to assist in this action, and gently re-deposits them, by folding them back into the remaining ingredients, when the leading edge 66 is turned away from the inner wall of the bowl 74.

What is claimed is:

1. A food mixing arrangement comprising:
   a mixer having a drive outlet; and
   a tool comprising a shaft and a wing-like volute blade having curved surfaces and being adapted for suspension by the shaft from the drive outlet for mixing ingredients in a mixing bowl, the drive outlet arranged to cause the blade to execute a planetary motion so that the shaft rotates in one direction around its own axis while being bodily moved in an opposite rotational direction about another axis parallel to, but offset from, that of the shaft;
   wherein the blade is helical in shape, extending outwardly from the shaft and twisting along the length of the shaft, such that the curved surfaces are formed to gently lift ingredients to be mixed in the bowl, and turn them towards a center of the bowl.

2. The food mixing arrangement according to claim 1, wherein the blade is elongate.

3. The food mixing arrangement according to claim 1, wherein a leading edge of the blade is thinned relative to the remainder of the blade.

4. The food mixing arrangement according to claim 3, wherein the blade thickens progressively from the leading edge towards a thicker central column providing strength for the tool.

5. The food mixing arrangement according to claim 1, wherein the volute blade comprises a part spiral form.

6. The food mixing arrangement according to claim 5, wherein the part spiral comprises 0.5 turn or less about the axis of the shaft.

7. The food mixing arrangement according to claim 6, wherein the part spiral comprises 0.45 turns about the axis of the shaft.

8. The food mixing arrangement according to claim 1, wherein the volute blade comprises one or more spiral turns.

9. The food mixing arrangement according to claim 1, wherein the wing-like blade further comprises an upper shoulder portion extending outwardly from the vicinity of the axis of the shaft and shaped to return to the mixture ingredients tending to move upwardly within the bowl.

10. The food mixing arrangement according to claim 1, wherein the wing-like blade is formed with a compound curvature and tilt to simulate manual folding of ingredients using a spoon.

11. The food mixing arrangement according to claim 1, wherein a leading edge of the tool supports a flexible elastomeric material.

\* \* \* \* \*